United States Patent Office 3,523,153
Patented Aug. 4, 1970

3,523,153
TRICHLORO HYDROXY ALUMINUM DERIVATIVES IN AEROSOL ANTIPERSPIRANT COMPOSITIONS
James M. Holbert, Lookout Mountain, and Stewart M. Beekman, Signal Mountain, Tenn., and Horst W. Schmank, Ringgold, Ga., assignors to Chattem Drug & Chemical Company, Chattanooga, Tenn., a corporation of Tennessee
No Drawing. Filed Feb. 14, 1966, Ser. No. 527,077
Int. Cl. A67k 7/00
U.S. Cl. 424—47       14 Claims

ABSTRACT OF THE DISCLOSURE

An aerosol antiperspirant composition in which the effective antiperspirant agent is a trichloro hydroxy aluminum derivative, the antiperspirant material forming a single phase system with anhydrous ethanol and propellant gases, the composition being stable with respect to precipitation and gelling for extended periods.

---

The present invention relates to a new group of low iron antiperspirant compositions which are substantially anhydrous, form homogeneous systems with fluorocarbon propellants, and are generally useful for the safe and effective reduction of sweating, particularly on the axillae. While the new materials have antiperspirant activity in any type of antiperspirant composition, they find particular utility in aerosol formulations.

The requirements for successful dispensing of antiperspirant compositions by aerosol are quite rigorous. The antiperspirant compositions must form clear, homogeneous systems with anhydrous ethanol and fluorocarbon propellants. They must not precipitate or gel within reasonable storage periods. They should contain only trace amounts of iron, since this metal inactivates compounds such as hexachlorophene and also catalyzes degradation of some organic perfume materials. The antiperspirant compositions should have a low acidity pH range on the order of 3.5 to 4.5 when mixed with water. They must be sufficiently soluble to be effective and they must be safe to use daily on the skin. Most important, they must be effective in inhibiting the flow of perspiration on the axillae.

Aluminum chloride hexahydrate has been used as an antiperspirant composition for a long time. Although it is compatible with anhydrous ethanol, compatible with propellants, and is an effective anhydrotic it is too acid to use daily, and has adversely affected the tensile strength of fabrics.

Aluminum phenolsulphonate has been used as an antiperspirant composition, and continues to be used. Its antiperspirant activity, however, is quite low.

In U.S. Pat. No. 2,823,169, there is a disclosure of the use of aluminum chlorohydroxide alcoholates having 0.25 to 1 hydroxyl for each aluminum atom in antiperspirant compositions. These materials, however, are rather unstable. What is more, they contain more than a trace amount of iron, usually on the order of 40 to 80 parts per million.

In U.S. Pat. 2,872,379 there is disclosed a series of alkoxy aluminum chlorides, but these compounds are limited in usefulness because of their very low solubility in anhydrous or absolute ethanol.

One of the objects of the present invention is to provide a new series of low iron antiperspirant compositions which form homogeneous systems with fluorocarbon propellants, and which are completely stable in the presence of absolute ethanol.

Another object of the invention is to provide an antiperspirant composition particularly suitable for application by means of an aerosol which is stable on storage for extended periods of time.

Still another object of the invention is to provide new antiperspirant compositions particularly useful in aerosols which effectively inhibit the flow of perspiration on the axillae.

The active ingredient of the compositions of the present invention is a compound having the following empirical formula:

$$Al_x(OH)_y(OR)_zCl_3$$

wherein $x$ is an integer from 3 to 6, inclusive, $y+z=3x-3$, $y$ is greater than $x$, and $z$ is an integer from 0 to 6, inclusive, the OR groups, when present, including from 1 to 6 isopropoxy groups, and the remaining OR groups, if any, being ethoxy groups.

As apparent from the foregoing formula, the compounds of the present invention are trichloro hydroxy aluminum derivatives which also may contain a substantial number of alkoxy groups. The alkoxy groups include at least one isopropoxy group and preferably include a mixture of both isopropoxy and ethoxy groups in the same molecule, to achieve a proper balance between solubility and stability.

The compounds of this invention are soluble in absolute ethanol and form a single phase system with standard gaseous propellants such as the chlorofluorocarbons and the fluorohydrocarbons. In addition, the compositions of the present invention are characterized by an iron content of more than 10 parts per million, calculated as Fe.

In a modified form of the present invention, the reaction mixture used to produce the compounds of the present invention also includes a higher alcohol which has emollient properties. Suitable higher alcohols are those aliphatic alcohols which contains from 12 to 18 carbon atoms per molecule. These fatty alcohols apparently form an addition product with the trichlorohydroxy aluminum compound. These alcohols can conveniently be added in solution in ethanol at a concentration of about 5 to 10% so that the final aerosol composition has 1 or 2% of the higher alcohol in it. Particularly good results have been attained with the use of hexadecanol, cetyl alcohol, and dodecanol.

Representative compounds coming within the class definition, arranged in order of increasing aluminum content are given in the following table:

$Al_3(OH)_6Cl_3$         $Al_5(OH)_6(OR)_6Cl_3$
$Al_3(OH)_5(OR)Cl_3$     $Al_5(OH)_8(OR)_4Cl_3$
$Al_3(OH)_4(OR)_2Cl_3$   $Al_5(OH)_9(OR)_3Cl_3$
$Al_4(OH)_5(OR)_4Cl_3$   $Al_6(OH)_9(OR)_6Cl_3$
$Al_4(OH)_6(OR)_3Cl_3$   $Al_6(OH)_{10}(OR)_5Cl_3$
$Al_4(OH)_7(OR)_2Cl_3$

The method involved in the synthesis of the compounds of the present invention comprises reacting aluminum chloride hexahydrate while dissolved in substantially anhydrous ethanol with aluminum isopropylate, and recovering the reaction products so produced. The term "anhydrous" when used herein refers to an alcohol containing at least 95% ethanol, and includes the "absolute" alcohol compositions which contain about 99% ethanol.

For every molecular proportion of aluminum chloride hexahydrate, there are present $(x-1)$ molecular proportions of aluminum isopropylate, using the same definition of x as previously. In the synthesis of the present invention, only moderately elevated temperatures are required, and the reaction product can be simply recovered by filtration. Vigorous agitation, however, is usually required during the addition of the aluminum isopropylate.

As previously mentioned, all of the commercially available fluorocarbons (and chlorofluorocarbons) presently used as aerosol propellants are satisfactory for use in accordance with the present invention. Different mixtures, of course, of these fluorocarbons can be used to achieve various vapor pressure levels. A typical example of a suitable propellant is a mixture of "Freon 11" and "Freon 12" which are, respectively, trichloromonofluoromethane and dichlorodifluoromethane. Other suitable mixtures include "Freon 12" and "Freon 114," the latter being dichlorotetrafluoroethane.

The following specific examples are submitted to illustrate the manner in which the compounds of the present invention are prepared, and combined with the other ingredients of an aersol composition, all percentages being by weight. It should be recognized, of course, that the other compounds falling within the class definition can be prepared in the same manner as the cited examples, with suitable changes in proportions. For example, additional water may be added to the substantially anhydrous ethanol to vary the ratio of Al:OH:OR as desired to obtain any of the specific compounds embraced within the generic formula.

EXAMPLE I

A compound having the empirical formula $$Al_4(OH)_6(OR)_3Cl_3$$

was prepared by dissolving 483 grams of aluminum chloride hexahydrate in 1000 grams of anhydrous ethanol in a four liter resin kettle. The solution was heated to 70° C. Then, 1225 grams of distilled aluminum isopropylate were slowly added with a high degree of agitation. The addition required 40 minutes. The batch was refluxed for an additional 70 minutes. The reaction product was filtered through a fritted glass Buchner type funnel under low vacuum. The total batch weight was 2708 grams. The clear filtrate had the following composition:

$Al_2O_3$—18.5% by weight
Cl—142.% 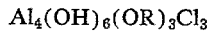
Al/Cl atomic ratio—4.3
Iron as Fe—4 p.p.m After 2½ months storage at 45° C., at ambient room temuperature, and at 110° C., the solution remained clear.

Aerosols were prepared from the above composition containing 20% of the aforementioned reaction product, 4% hexadecyl alcohol, 2% silicone fluid, 0.25% hexachlorophene, 23.8% anhydrous ethanol ("SD 40") and 50% of a fluorocarbon propellant, the latter consisting of a mixture of "Freon 11" and "Freon 12." After storage at room temperature, at 45° C., and at 110° C. for more than 2 months, the composition was still clear and apparently unchanged in character.

This synthesis can be illustrated by the following equation:

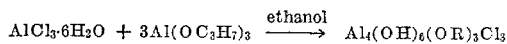

EXAMPLE II

The compound $Al_5(OH)_6(OR)_6Cl_3$ was prepared by dissolving 483 grams of aluminum chloride hexahydrate in 1000 grams of anhydrous ethanol and heating to 80° C. in a 4 liter resin kettle. Distilled liquid aluminum isopropylate in an amount of 1634 grams was added dropwise with vigorous agitation. The addition was completed in 65 minutes. The batch was refluxed for one hour and the product was filtered through a fritted glass Buchner type funnel. The batch weighed 1320 grams and was diluted with an additional amount of anhydrous ethanol to yield 2360 grams of solution. The composition of the clear, almost colorless fluid was found to be as follows:

$Al_2O_3$—9.66%
Cl—3.99%
Al/Cl atomic ratio—5.0:3.0
Iron as Fe—6 p.p.m.
Sulfates—1.5 p.p.m.
Sp. gr. 20°/20°—0.8838

This composition constituted 20% by weight of the final composition which included 45% by weight of a 25–75 blend of "Freon 12" and Freon 114," the balance being absolute ethanol. These arerosols remained clear and apparently unchanged in character after storage at room temperature, 45° C., and 110° C. for more than two months.

EXAMPLE III

The following procedure was used to prepare a compound having the formula:

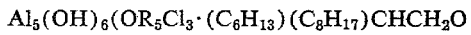

In 300 grams of absolute ethanol, we dissolved 121 grams of aluminum chloride hexahydrate. The temperature was raised to 70° C. and then 121 grams of hexadecyl alcohol were slowly added, with vigorous stirring. The temperature was increased to 820 C. Then, 408 grams of liquid distilled aluminum isopropylate were slowly added. The whole mixture was allowed to reflux with stirring for 50 minutes. It was then filtered in a fritted glass Buchner funnel. The solution had the following composition:

Appearance—clear
$Al_2O_3$—9.98%
Cl—3.56%
Fe—5 p.p.m.
Sp. gr. 20°/70°—0.9170
pH (1 part in 5 parts $H_2O$)—4.3

After 2½ months storage at 45° C., room temperature, and 110° C., the solution remained clear and was apparently unchanged in character.

Aerosols containing 20% by weight of the above composition were stored for more than 2 months at 45° C., room temperature, and 110° C. without precipitation, gelation, or other apparent changes in character.

EXAMPLE IV

The following example illustrates the preparation of a hydroxy aluminum chloride having the empirical formula $Al_3(OH)_6Cl_3$. In this synthesis, 1500 grams of anhydrous ethanol were added to a 4 liter resin kettle, the temperature being 27° C. Then, 724 grams of aluminum chloride hexahydrate were dissolved in the kettle and the solution was heated to 82° C. At this time, 1225 grams of liquid aluminum isopropoxide were added dropwise with vigorous agitation over a 50 minute period. After the addition of the aluminum isopropoxide, the reaction mass was refluxed for an additional 65 minutes at 82° C. The batch was filtered through a fritted glass Buchner funnel using a low vacuum. Additional alcohol was added to compensate for any loss through evaporation. The product was a clear, water-white liquid having the following composition:

$Al_2O_3$—13.7%
Cl—9.0%
Fe—3 p.p.m.
Heavy metals as Pb—less than 5 p.p.m.
Sulfates—2 p.p.m.
pH (1 part in 5 parts $H_2O$)—4.0
Sp. gr. 20°/20°—0.9876

This reaction product was combined with the propellants employed in Example II. Stable, apparently unchanged solutions resulted after storage at room temperature, at 45° C., and at 110° C. for two months.

The relative amounts of reaction product (in ethanol solution) and fluorocarbon propellants will be varied depending upon the viscosity of the reaction product, the size of the valve and the aerosol dispenser, and similar factors. Generally, however, from 10 to 40% by weight of the reaction product (of a 25% solids concentration) can be combined with 20 to 50% by weight anhydrous ethanol, and the balance being a mixture of the fluorocarbon propellants. The amount of solids thus ranges from 2.5 to 10%.

It is desirable in our method to use an iron-free aluminum chloride hexahydrate rather than $AlCl_3$ and to use a substantially iron-free liquid, distilled isopropoxide which is also readily available. Anhydrous $AlCl_3$ normally contains a substantial amount of iron contamination and must be subjected to relatively expensive sublimation and resublimation to render it substantially iron-free.

While the foregoing disclosure has concerned itself with the chloro derivatives, the corresponding bromo and iodo derivatives can also be produced by these methods, although only the chloro compounds are completely suitable for use as antiperspirants.

It will be understood that various modifications can be made to the described embodiments without departing from the scope of the present invention.

We claim as our invention:

1. An aerosol antiperspirant composition in which the active ingredient consists essentially of a compound having the empirical formula:

$$Al_x(OH)_y(OR)_zCl_3$$

where $x$ is an integer from 3 to 6, inclusive, $y+z=3x-3$, $y$ is greater than $x$, $z$ is an integer from 0 to 6, inclusive, the OR groups, when present including from 1 to 6 isopropoxy groups, and the remaining OR groups, if any, being ethoxy groups, in combination with a propellant consisting of a liquefied gas selected from the group consisting of chlorofluorocarbons and fluorohydrocarbons, said compound being dissolved in anhydrous ethanol, said composition being suitable as a single phase system, the composition containing from about 2.5% to 10% by weight of said active ingredient, from about 20 to 50% ethanol, and the balance being essentially said propellant.

2. The composition of claim 1 in which said compound has the formula $Al_5(OH)_6(OR)_6Cl_3$.

3. The composition of claim 1 in which said compound has the formula $Al_4(OH)_6(OR)_3Cl_3$.

4. The composition of claim 1 in which said compound has the formula $Al_3(OH)_6Cl_3$.

5. The composition of claim 1 in which said compound has the formula $Al_5(OH)_8(OR)_4Cl_3$.

6. The composition of claim 1 in which said compound has the formula $Al_5(OH)_9(OR)_3Cl_3$.

7. The composition of claim 1 in which said compound has the formula $Al_3(OH)_5(OR)Cl_3$.

8. The composition of claim 1 in which said compound has the formula $Al_3(OH)_4(OR)_2Cl_3$.

9. The composition of claim 1 in which said compound has the formula $Al_4(OH)_5(OR)_4Cl_3$.

10. The composition of claim 1 in which said compound has the formula $Al_4(OH)_7(OR)_2Cl_3$.

11. The composition of claim 1 in which said compound has the formula $Al_6(OH)_9(OR)_6Cl_3$.

12. The composition of claim 1 in which said compound has the formula $Al_6(OH)_{10}(OR)_5Cl_3$.

13. The method of producing a compound having the empirical formula $Al_x(OH)_y(OR)_zCl_3$ where $x$ is an integer from 3 to 6 inclusive, $y+z=3x-3$, $y$ is greater than $x$, $z$ is an integer from 0 to 6, the OR groups, when present, including from 1 to 6 isopropoxy groups, and the remaining OR groups, if any, being ethoxy groups, which comprises reacting aluminum chloride hexahydrate while dissolved in anhydrous ethanol with liquid aluminum isopropylate, and recovering the reaction product so produced.

14. The method of claim 13 in which the aluminum chloride hexahydrate and said aluminum isopropylate are added in the amounts of 1 molecular proportion of aluminum chloride hexahydrate to $(x-1)$ molecular proportions of aluminum isopropylate.

References Cited

UNITED STATES PATENTS

| | | | |
|---|---|---|---|
| 2,791,486 | 5/1957 | Appell | 167—90 X |
| 2,823,144 | 2/1958 | Dalton | 260—448 X |
| 2,823,169 | 2/1958 | Brown et al. | 167—90 |
| 2,872,379 | 2/1959 | Neumann et al. | 167—90 |
| 3,359,169 | 12/1967 | Slater et al. | 167—90 |

OTHER REFERENCES

Chemical Abstracts, 52: 19030a (1958).

ALBERT T. MEYERS, Primary Examiner

V. C. CLARKE, Assistant Examiner

U.S. Cl. X.R.

23—50, 52, 92; 260—448; 424—68

UNITED STATES PATENT OFFICE
CERTIFICATE OF CORRECTION

Patent No. 3,523,153          Dated August 4, 1970

Inventor(s) Holbert et al.

It is certified that error appears in the above-identified patent and that said Letters Patent are hereby corrected as shown below:

Column 2, line 32 "of more" should read --of no more--.

Column 3, line 42, "142%" should read --14.2%--.

Column 3, line 43, "4.3" should read --4:3--.

Column 3, line 46, "temuperature" should read --temperature--.

Column 4, line 18 "(OR$_5$Cl$_3$" should read --(OR)$_5$Cl$_3$--.

Column 4, line 23 "820°C" should read --82°C--.

Column 5, line 37, "suitable" should read --stable--.

Column 6, line 13 "producting" should read --producing--.

Signed and sealed this 24th day of August 1971.

(SEAL)
Attest:

EDWARD M. FLETCHER, JR.
Attesting Officer

WILLIAM E. SCHUYLER, JR.
Commissioner of Patents